United States Patent
Liu

(10) Patent No.: US 8,084,989 B2
(45) Date of Patent: Dec. 27, 2011

(54) BATTERY CHARGER WITH CHARGING REMINDING CAPABILITY

(75) Inventor: George Liu, Taichung (TW)

(73) Assignee: Juye LII International Co., Ltd., Taichung (TW)

( * ) Notice: Subject to any disclaimer, the term of this patent is extended or adjusted under 35 U.S.C. 154(b) by 182 days.

(21) Appl. No.: 12/454,650

(22) Filed: May 20, 2009

(65) Prior Publication Data

US 2010/0052610 A1    Mar. 4, 2010

(30) Foreign Application Priority Data

Aug. 26, 2008  (TW) .............................. 97132532 A

(51) Int. Cl.
*H02J 7/14* (2006.01)
*H01R 25/00* (2006.01)
*H01R 13/657* (2006.01)

(52) U.S. Cl. .................. 320/105; 439/295; 439/357
(58) Field of Classification Search .................. 320/105, 320/152, 157–159, 162–164; 439/295, 357
See application file for complete search history.

(56) References Cited

U.S. PATENT DOCUMENTS 5,793,185 A * 8/1998 Prelec et al. .................. 320/104
7,199,555 B2 * 4/2007 Hung ............................ 320/114
* cited by examiner

*Primary Examiner* — Richard V Muralidar
(74) *Attorney, Agent, or Firm* — Kilpatrick Townsend & Stockton LLP

(57) ABSTRACT

A battery charger includes a rechargeable battery for providing electric power to an external rechargeable battery through a damper unit so as to charge the external rechargeable battery, and a control unit coupled to a charging socket and the rechargeable battery and operable to charge the rechargeable battery through a charging signal received by the charging socket. An alarm unit is coupled to the rechargeable battery and the charging socket for generating a detecting signal based on a battery voltage of the rechargeable battery, for outputting a reminder output upon detecting that a potential of the detecting signal is less than that of a reference signal, and for terminating the reminder output when the charging socket receives the charging signal.

8 Claims, 5 Drawing Sheets

US 8,084,989 B2

BATTERY CHARGER WITH CHARGING REMINDING CAPABILITY

CROSS-REFERENCE TO RELATED APPLICATION

This application claims priority to Taiwanese Application No. 097132532, filed Aug. 26, 2008, the disclosure of which is incorporated herein by reference.

BACKGROUND OF THE INVENTION

1. Field of the Invention

The invention relates to a battery charger, more particularly to a battery charger with a charging reminding capability.

2. Description of the Related Art

FIG. 1 illustrates a conventional battery charger 101 for charging a car battery (not shown). The conventional battery charger 101 includes a rechargeable battery (not shown), an operating button 11, a control unit (not shown) and a display unit 12. The operating button 11 is operable so as to output an input signal to the control unit. The control unit detects residual power of the rechargeable battery upon receipt of the input signal, and outputs an output signal corresponding to the residual power of the rechargeable battery to the display unit 12. The display unit 12 includes a plurality of light-emitting elements, and outputs a visual output indicating the residual power of the rechargeable battery. As a result, a user is able to determine a charged state of the rechargeable battery based on the visual output outputted by the display unit 12.

FIG. 2 illustrates another conventional battery charger 102 that has a configuration similar to that of the conventional battery charger 101. In the conventional battery charger 102, residual power of a rechargeable battery (not shown) can be detected through operation of a button 13 such that the residual power of the rechargeable battery is indicated by an indicator 14.

However, the aforesaid conventional battery chargers 101, 102 cannot effectively ensure that they are maintained in a usable state if a user does not appropriately detect the charged state of the rechargeable batteries therein.

SUMMARY OF THE INVENTION

Therefore, the object of the present invention is to provide a battery charger with a charging reminding capability that can eliminate the aforesaid drawback of the prior art.

According to the present invention, a battery charger comprises:

a charging socket adapted to receive a charging signal;

a clamper unit including a pair of clampers;

a rechargeable battery coupled to the clamper unit and adapted for providing electric power to an external rechargeable battery through the clamper unit so as to charge the external rechargeable battery;

a control unit coupled to the charging socket and the rechargeable battery and operable to charge the rechargeable battery through the charging signal received by the charging socket; and an alarm unit coupled to the rechargeable battery and the charging socket for generating a detecting signal based on a battery voltage of the rechargeable battery, for outputting a reminder output upon detecting that a potential of the detecting signal is less than that of a reference signal, and for terminating the reminder output when the charging socket receives the charging signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
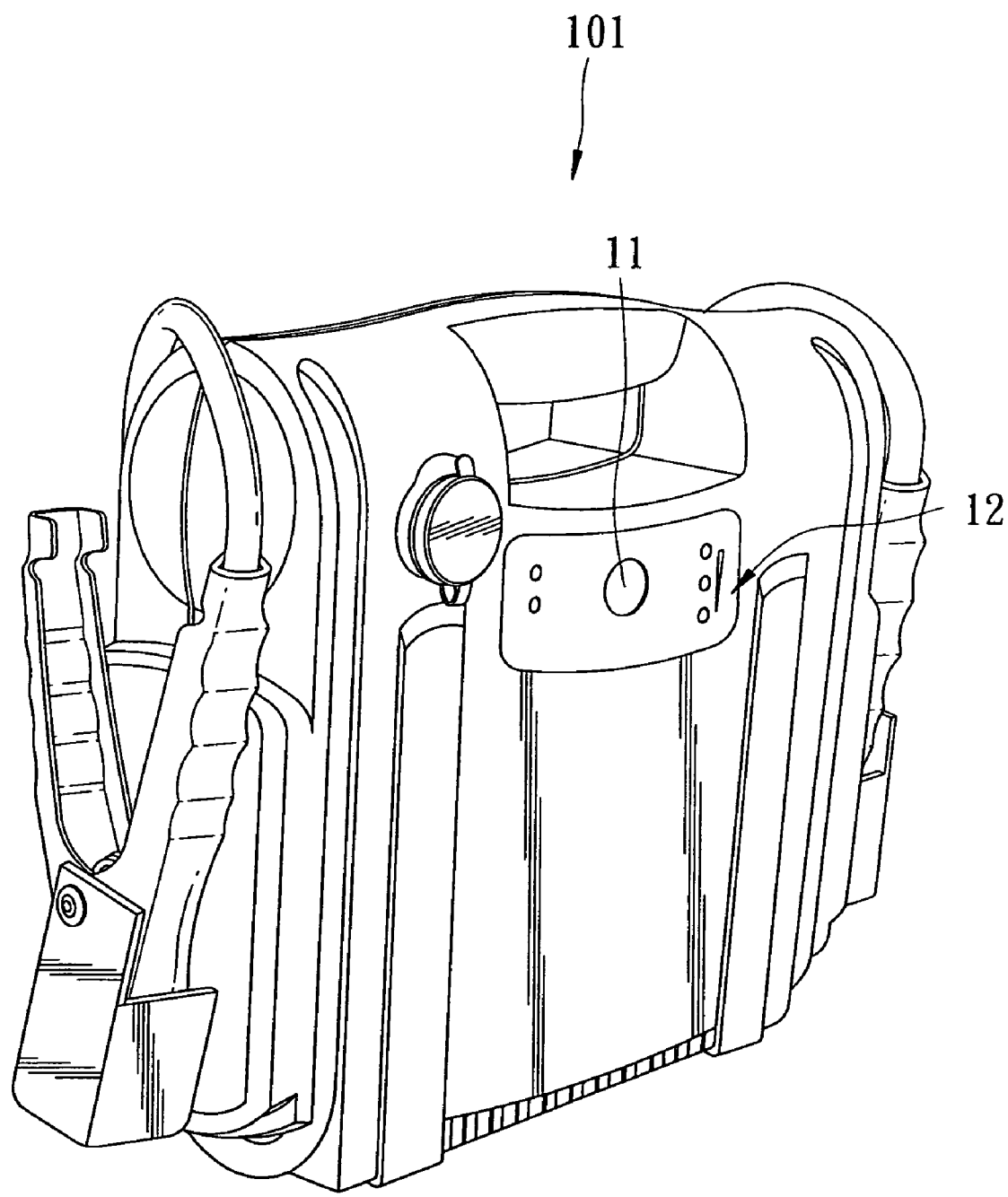
FIG. 1 is a perspective view of a conventional battery charger.
Figure 2:
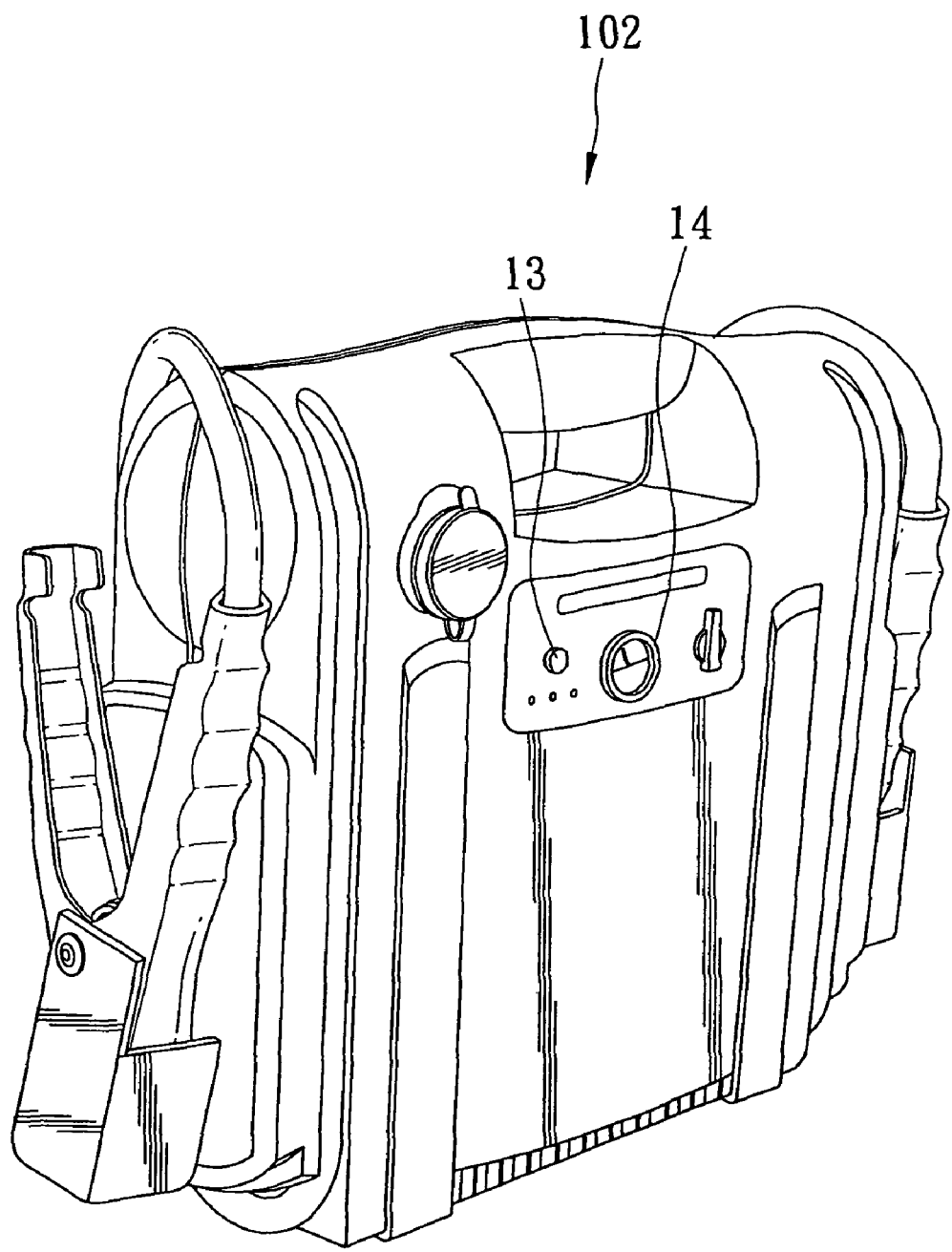
FIG. 2 is a perspective view of another conventional battery charger.

Before the present invention is described in greater detail, it should be noted that like elements are denoted by the same reference numerals throughout the disclosure.

Figure 3:
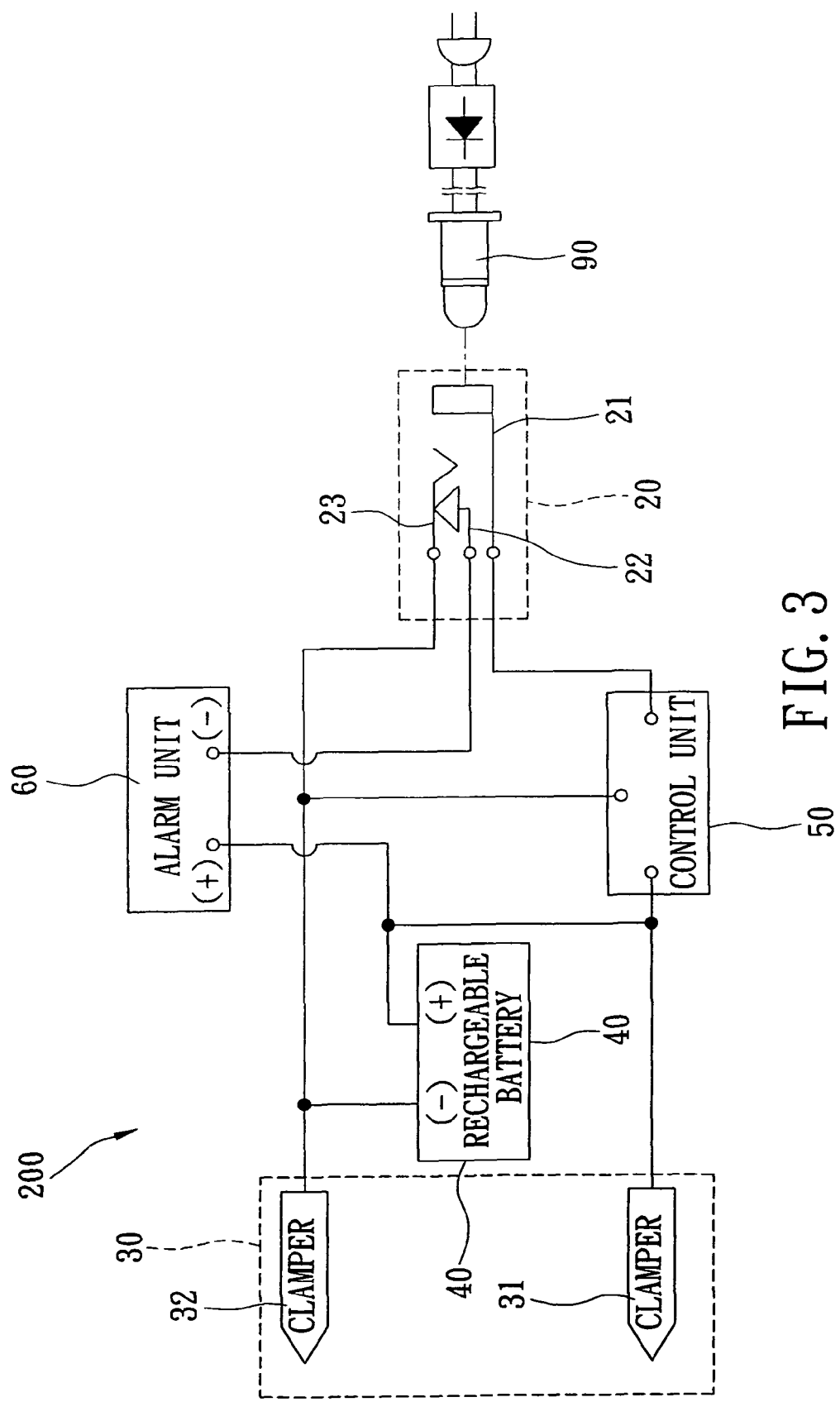
FIG. 3 is a schematic circuit block diagram illustrating the first preferred embodiment of a battery charger according to the present invention.
Figure 4:
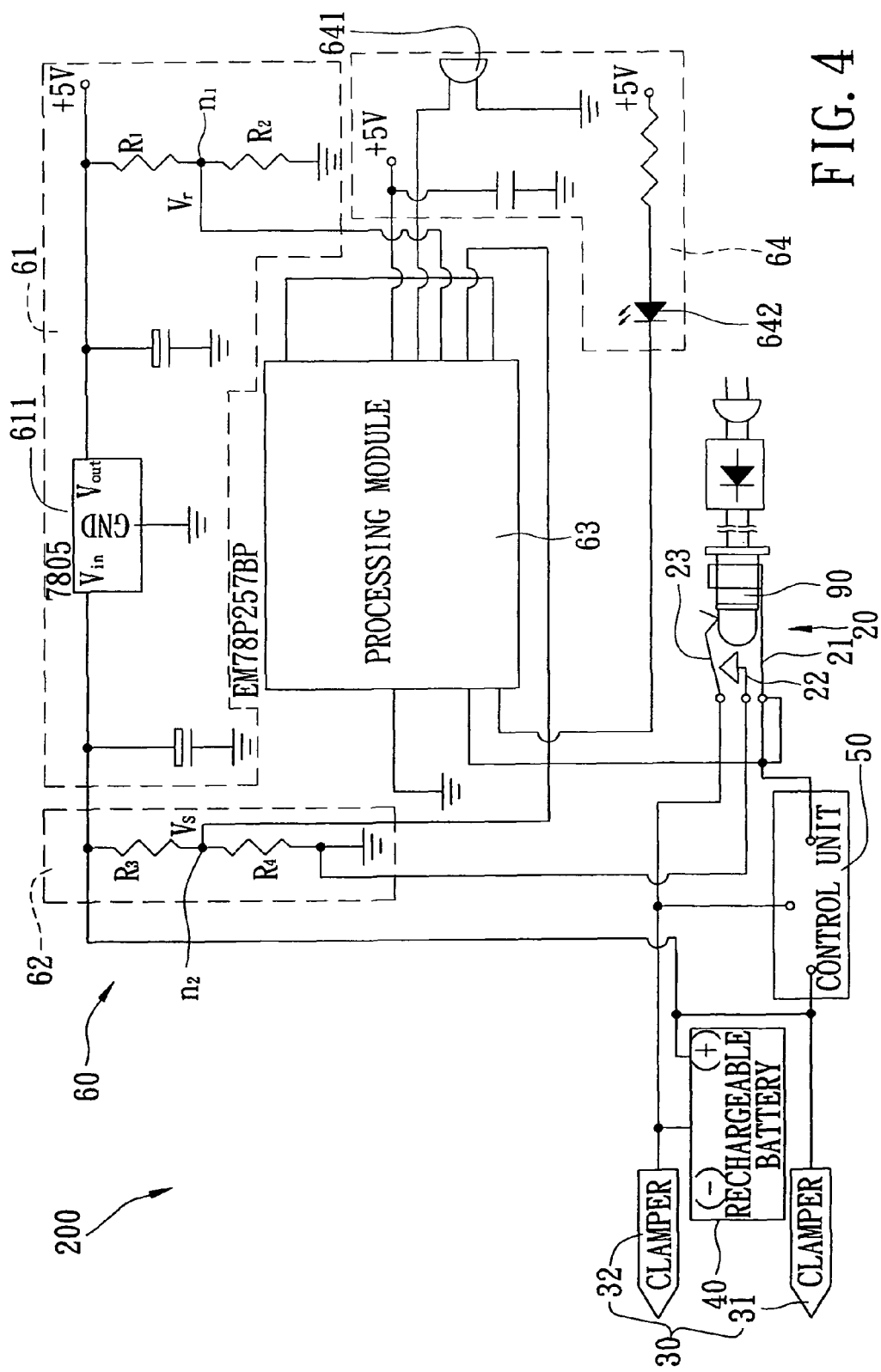
FIG. 4 is a schematic electrical circuit block diagram illustrating the first preferred embodiment.

Referring to FIGS. 3 and 4, the first preferred embodiment of a battery charger 200 according to the present invention is shown to include a charging socket 20, a clamper unit 30, a control unit 50, and an alarm unit 60.

The charging socket 20 is adapted to receive a charging signal. In this embodiment, the charging socket 20 includes a positive terminal 21, a resilient negative terminal 23 spaced apart from the positive terminal 21, and a ground terminal 22 spaced apart from the positive terminal 21. The charging socket 20 is operable so as to switch from a non-charging state to a charging state when coupled with an external power plug 90 that provides the charging signal. The negative terminal 23 electrically contacts the ground terminal 22 when the charging socket 20 is at the non-charging state, as shown in FIG. 3. The negative terminal 23 is spaced apart from the ground terminal 22 when the charging socket 20 is at the charging state, as shown in FIG. 4. In this embodiment, the charging signal provided by the external power plug 90 is a DC power signal.

The clamper unit 30 includes a pair of clampers 31, 32.

The rechargeable battery 40, such as a lead-acid rechargeable battery of 12V/17 AH, is coupled to the clamper unit 30, and is adapted for providing electric power to an external rechargeable battery (not shown), such as a car battery, through the clamper unit 30 so as to charge the external rechargeable battery.

In this embodiment, the control unit 50 is coupled to the positive and negative terminals 21, 23 of the charging socket 20 and the rechargeable battery 40, and is operable to charge the rechargeable battery 40 through the charging signal received by the charging socket 20.

The alarm unit 60 is coupled to the rechargeable battery 40, and the positive terminal 21 and the ground terminal 22 of the charging socket 20 for generating a detecting signal ($V_s$) based on a battery voltage of the rechargeable battery 40, for outputting a reminder output upon detecting that a potential of the detecting signal ($V_s$) is less than that of a reference signal ($V_r$), and for terminating the reminder output when the charging socket 20 receives the charging signal. In this embodiment, the alarm unit 60 includes a regulating module 61, a detecting module 62, a processing module 63, and an output module 64.

The regulating module 61 is coupled to the rechargeable battery 40 for generating the reference signal ($V_r$). In this embodiment, the regulating module 61 includes a regulating chip 611, such as a 7805 IC, coupled to the rechargeable battery 40, and a series connection of first and second resistors ($R_1$, $R_2$) coupled between the regulating chip 611 and ground. The potential of the reference signal ($V_r$) is a potential at a common mode (n1) of the first and second resistors ($R_1$, $R_2$).

The detecting module 62 is coupled to the rechargeable battery 40 for generating the detecting signal ($V_s$). In this embodiment, the detecting module 62 includes third and fourth resistors ($R_3$, $R_4$) coupled in series between the rechargeable battery 40 and ground. The potential of the detecting signal ($V_s$) is a potential at a common node (n2) of the third and fourth resistors ($R_3$, $R_4$).

The processing module 63 is coupled to the regulating module 61 and the detecting module 62 for receiving the reference signal ($V_r$) and the detecting signal ($V_s$) therefrom and for generating a control signal upon detecting that the potential of the detecting signal ($V_s$) is less than that of the reference signal ($V_r$). In this embodiment, the processing module 63 includes a microprocessor, such as an EM78P257BP IC. It is noted that the processing module 63 ceases outputting of the control signal upon detecting of receipt of the charging signal by the charging socket 20.

The output module 64 is coupled to the processing module 63 for outputting the reminder output in response to the control signal from the processing module 63. In this embodiment, the output module 64 includes a buzzer 641 that responds to the control signal from the processing module 63 to generate periodical sound outputs, and a light-emitting element 642 that responds to the control signal from the processing module 63 to generate a visual output. The periodical sound outputs and the visual output serve as the reminder output.

In sum, when the potential of the detecting signal ($V_s$) is less than that of the reference signal ($V_r$), this indicates that the battery voltage of the rechargeable battery 40 is less than a load voltage, such as 7.2V in this embodiment. As a result, the output module 64 outputs the reminder output in response to the control signal from the processing module 63 until the charging socket 20 receives the charging signal. Therefore, a user can be effectively reminded to perform charging of the rechargeable battery 40, thereby ensuring that the battery charger 200 of this invention is maintained in a usable state.

Figure 5:
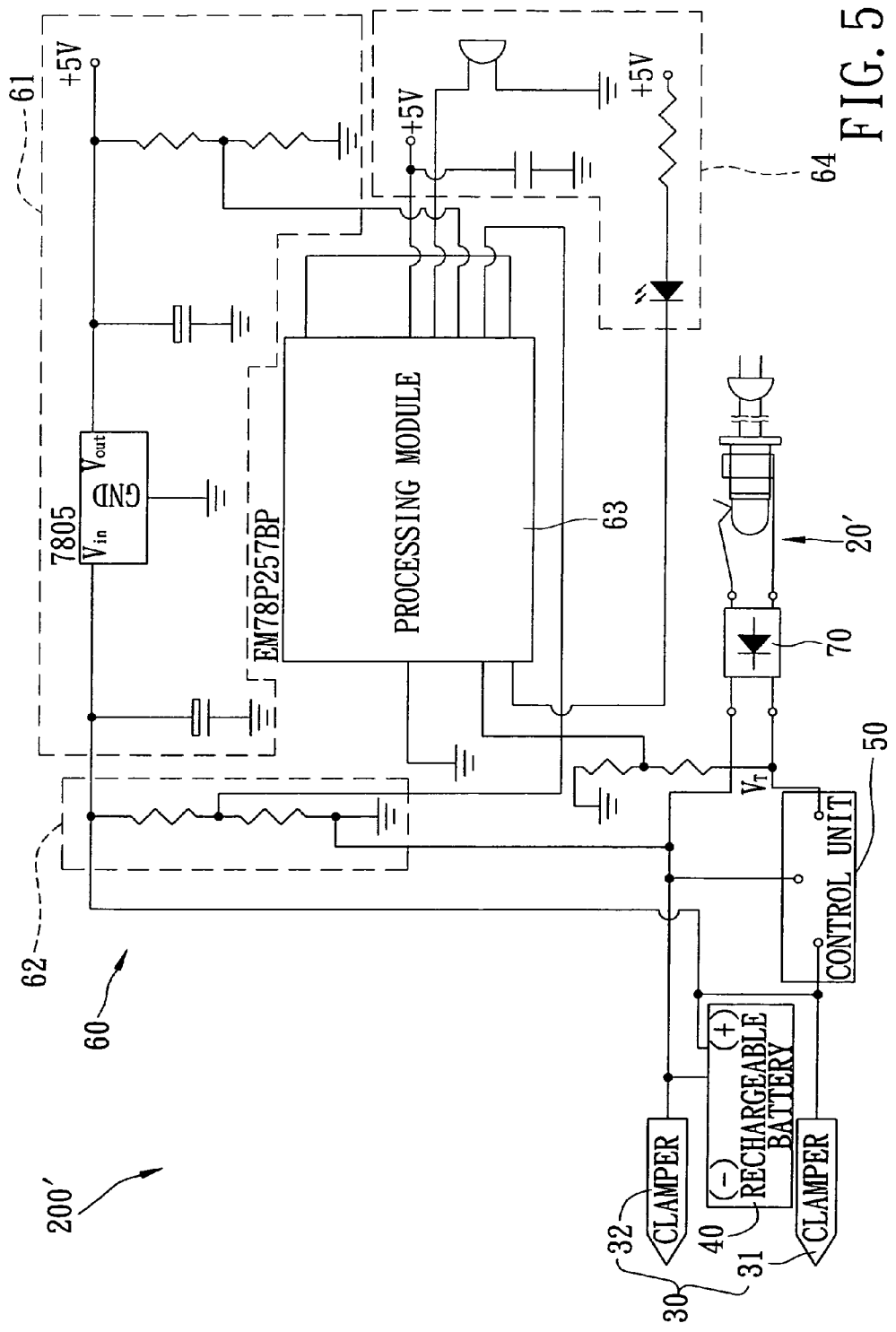
FIG. 5 is a schematic electrical circuit block diagram illustrating the second preferred embodiment of a battery charger according to the present invention.

FIG. 5 illustrates the second preferred embodiment of a battery charger 200' according to this invention, which is a modification of the first preferred embodiment. In this embodiment, the charging socket 20' includes a positive terminal and a resilient negative terminal.

The battery charger 200' further includes a rectifying unit 70 coupled to the charging socket 20', the control unit 50 and the alarm unit 60. The charging signal received by the charging socket 20' is an AC power signal. The rectifying unit 70 rectifies the charging signal from the charging socket 20' to generate a DC voltage output ($V_T$) that is outputted to the control unit and the alarm unit 60. Therefore, when the processing module 63 receives the DC voltage output ($V_T$), the processing module 63 ceases outputting of the control signal so as to terminate the reminder output.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A battery charger comprising:
    a charging socket adapted to receive a charging signal;
    a damper unit including a pair of dampers;
    a rechargeable battery coupled to said clamper unit and adapted for providing electric power to an external rechargeable battery through said damper unit so as to charge the external rechargeable battery;
    a control unit coupled to said charging socket and said rechargeable battery and operable to charge said rechargeable battery through the charging signal received by said charging socket; and
    an alarm unit coupled to said rechargeable battery and said charging socket for generating a detecting signal based on a battery voltage of said rechargeable battery, for outputting a reminder output upon detecting that a potential of the detecting signal is less than that of a reference signal, and for terminating the reminder output when said charging socket receives the charging signal;
    wherein said charging socket includes a positive terminal coupled to said control unit and said alarm unit, a resilient negative terminal spaced apart from said positive terminal and coupled to at least one of said control unit and said damper unit, and a ground terminal spaced apart from said positive terminal, said charging socket being operable so as to switch from a non-charging state to a charging state when coupled with an external power plug that provides the charging signal, said negative terminal electrically contacting said ground terminal when said charging socket is at the non-charging state, said negative terminal being spaced apart from said ground terminal when said charging socket is at the charging state.

2. The battery charger as claimed in claim 1, wherein said alarm unit includes:
    a regulating module coupled to said rechargeable battery for generating the reference signal;
    a detecting module coupled to said rechargeable battery for generating the detecting signal;
    a processing module coupled to said regulating module and said detecting module for receiving the reference signal and the detecting signal therefrom and for generating a control signal upon detecting that the potential of the detecting signal is less than that of the reference signal; and
    an output module coupled to said processing module for outputting the reminder output in response to the control signal from said processing module, and
    wherein said processing module ceases outputting of the control signal upon detection of receipt of the charging signal by said charging socket.

3. The battery charger as claimed in claim 2, wherein said regulating module includes a regulating chip coupled to said rechargeable battery, and a series connection of first and second resistors coupled between said regulating chip and ground, the potential of the reference signal being a potential at a common node of said first and second resistors.

4. The battery charger as claimed in claim 2, wherein said detecting module includes first and second resistors coupled in series between said rechargeable battery and ground, the potential of the detecting signal being a potential at a common node of said first and second resistors.

5. The battery charger as claimed in claim 2, wherein said processing module includes a microprocessor.

6. The battery charger as claimed in claim 2, wherein said output module includes a buzzer that responds to the control signal from said processing module to generate periodical sound outputs serving as the reminder output.

7. The battery charger as claimed in claim 2, wherein said output module includes a light-emitting element that responds to the control signal from said processing module to generate a visual output serving as the reminder output.

8. The battery charger as claimed in claim 1, further comprising a rectifying unit coupled to said charging socket, said control unit and said alarm unit, the charging signal received by said charging socket being an AC power signal, said rectifying unit rectifying the charging signal from said charging socket to generate a DC voltage output that is outputted to said control unit and said alarm unit.

* * * * *